US012567973B2

(12) United States Patent
Yang et al.

(10) Patent No.: US 12,567,973 B2
(45) Date of Patent: Mar. 3, 2026

(54) GALOIS HASH AUTHENTICATION-BASED CIRCUIT

(71) Applicant: Montage Electronics (Shanghai) Co., Ltd., Shanghai (CN)

(72) Inventors: Jun Yang, Shanghai (CN); Yang Chao, Shanghai (CN); Men Long, Shanghai (CN)

(73) Assignee: Montage Electronics (Shanghai) Co., Ltd., Shanghai (CN)

( * ) Notice: Subject to any disclaimer, the term of this patent is extended or adjusted under 35 U.S.C. 154(b) by 59 days.

(21) Appl. No.: 18/892,553

(22) Filed: Sep. 23, 2024

(65) Prior Publication Data

US 2025/0106037 A1 Mar. 27, 2025

(30) Foreign Application Priority Data

Sep. 25, 2023 (CN) .......................... 202311244378.1

(51) Int. Cl.
*H04L 9/32* (2006.01)
*H04L 9/06* (2006.01)

(52) U.S. Cl.
CPC .......... *H04L 9/3242* (2013.01); *H04L 9/0637* (2013.01)

(58) Field of Classification Search
CPC ............................ H04L 9/3242; H04L 9/0637
See application file for complete search history.

(56) References Cited

U.S. PATENT DOCUMENTS

| | | | |
|---|---|---|---|
| 2019/0281025 A1* | 9/2019 | Harriman | H04L 9/3239 |
| 2021/0089388 A1* | 3/2021 | Makaram | H04L 9/3242 |
| 2023/0129113 A1* | 4/2023 | Dai | G06F 11/10 |
| | | | 726/27 |
| 2023/0239136 A1* | 7/2023 | Gribok | H04L 9/0637 |
| | | | 380/28 |
| 2023/0283452 A1* | 9/2023 | Webster | H04L 9/14 |
| | | | 713/168 |
| 2024/0178845 A1* | 5/2024 | Choi | H03L 7/091 |
| 2024/0388420 A1* | 11/2024 | Hamburg | H04L 9/0643 |
| 2025/0106037 A1* | 3/2025 | Yang | H04L 9/0637 |

* cited by examiner

*Primary Examiner* — Harris C Wang
(74) *Attorney, Agent, or Firm* — JCIPRNET

(57) ABSTRACT

The disclosure provides a Galois hash authentication-based circuit. An additional authentication data calculation circuit receives the first data block in the data stream and performs calculation according to the first data block, and shifts the calculation result to the left to generate a first output. A ciphertext calculation circuit includes k first calculation units, used to receive in parallel the second data blocks in the data stream in each round of calculation of the ciphertext calculation circuit, and perform parallel calculation on each data block received to generate a second output. The bubble processing circuit receives the first quantity of the third data blocks after the last round of calculation of the ciphertext calculation circuit and performs calculation to generate a third output. A message authentication code is calculated according to the first output, the second output, and the third output.

15 Claims, 7 Drawing Sheets

10

| Data packet | Interval | Data packet | Interval | Data packet |
|---|---|---|---|---|

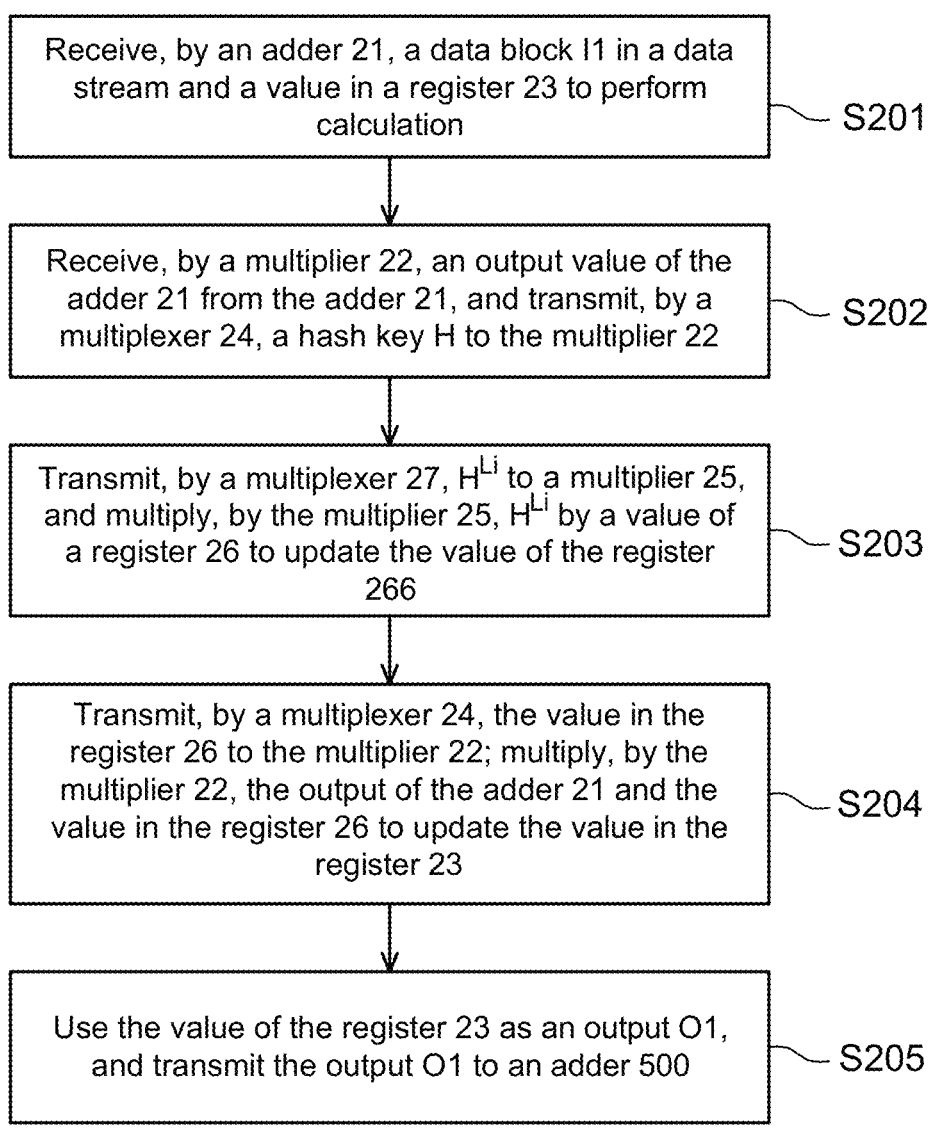

Receive, by an adder 21, a data block I1 in a data stream and a value in a register 23 to perform calculation ⟍ S201

Receive, by a multiplier 22, an output value of the adder 21 from the adder 21, and transmit, by a multiplexer 24, a hash key H to the multiplier 22 ⟍ S202

Transmit, by a multiplexer 27, $H^{Li}$ to a multiplier 25, and multiply, by the multiplier 25, $H^{Li}$ by a value of a register 26 to update the value of the register 266 ⟍ S203

Transmit, by a multiplexer 24, the value in the register 26 to the multiplier 22; multiply, by the multiplier 22, the output of the adder 21 and the value in the register 26 to update the value in the register 23 ⟍ S204

Use the value of the register 23 as an output O1, and transmit the output O1 to an adder 500 ⟍ S205

FIG. 3B

GALOIS HASH AUTHENTICATION-BASED CIRCUIT

CROSS-REFERENCE TO RELATED APPLICATION

This application claims the priority benefit of China application serial no. 202311244378.1, filed on Sep. 25, 2023. The entirety of the above-mentioned patent application is hereby incorporated by reference herein and made a part of this specification.

BACKGROUND

Technical Field

The disclosure relates to a Galois hash authentication-based circuit.

Description of Related Art

The current GHASH (Galois hash) is mainly used to authenticate Ethernet applications (such as routers, switches, or bridges). FIG. 1A is a schematic diagram of a data flow based on the Ethernet protocol. Referring to FIG. 1A, there are intervals between adjacent data packets of the Ethernet data stream. Therefore, the communication device may use the interval between the adjacent data packets to complete the GHASH operation on the bubble, in which the bubble may be length data, or CRC data and the length data. However, in some communication interconnection protocols, for example, PCIe-Gen6 (peripheral component interconnect express-generation 6) and CXL (compute express link), the flow control unit (flit) is used as the basic unit of transmission. Taking the CXL protocol as an example, FIG. 1B shows a schematic diagram of the data flow of the CXL protocol. The CXL data stream may contain multiple consecutive flits, such as F1, F2, and F3. There is no interval between adjacent flits. Therefore, how to process the bubble data without blocking the CXL data flow is a problem.

In addition, compared with Ethernet, CXL has higher throughput (128 Gbps, 256 Gbps or higher) and data width is above 512 bit. Therefore, when the length of the GHASH data block is 128 bits, four 128-bit data blocks need to be processed in a single clock cycle, which requires a higher parallel calculation architecture.

Furthermore, in Ethernet, GHASH operations may be performed on a packet basis, additional authentication data (AAD), ciphertext or plain text may be processed sequentially in an input order, in which AAD comes from the header of the Ethernet data packet, and the ciphertext or plain text comes from the payload of the data packet. In the CXL protocol, AAD and the ciphertext or plain text are input in parallel, and may not be processed according to the order.

Therefore, a method for performing GHASH authentication on a data stream continuously transmitted without intervals (for example, a data stream using flits as the basic transmission unit) is one of the important topics in this field.

SUMMARY

The disclosure is directed to a Galois hash (GHASH) authentication-based circuit, which can perform GHASH operations on data streams (such as CXL data streams) continuously transmitted without intervals.

In an embodiment of the disclosure, a Galois hash authentication-based circuit is provided, the Galois hash authentication-based circuit is used to perform calculation processing on a data sequence including a first data block, a second data block, and a third data block; and the Galois hash authentication-based circuit includes an additional authentication data calculation circuit, a ciphertext calculation circuit, a bubble processing circuit, a controller, and a first adder. The additional authentication data calculation circuit receives a first data block in a data stream and performs calculation based on the first data block, and shifts a calculation result to left according to a total length of a second data block and a third data block to generate a first output. The ciphertext calculation circuit includes k first calculation units, is configured to receive in parallel a second data block in the data stream in each round of calculation of the ciphertext calculation circuit, and perform parallel calculation on each of data block received to generate a second output, wherein k is a positive integer greater than 1. The bubble processing circuit receives a first quantity of third data blocks after a last round of calculation of the ciphertext calculation circuit and performs calculation to generate a third output. The controller is coupled to the additional authentication data calculation circuit, the ciphertext calculation circuit, and the bubble processing circuit. The first adder is configured to perform calculation according to the first output, the second output, and the third output to generate a message authentication code.

In an embodiment of the disclosure, the first calculation unit further receives in parallel the second quantity of third data blocks in the last round of calculation, and values of the first quantity and the second quantity are determined by the controller based on a value of k, a quantity of the third data blocks, and a quantity of the second data blocks received in the last round of calculation.

In an embodiment of the disclosure, the first calculation unit performs calculation according to the received second data block or the third data block and a first power function of a hash key; a power of the first power function of the hash key is determined by the controller according to an order of the second data block or the third data block in the data sequence and the value of k.

In an embodiment of the disclosure, when the received second data block or the third data block is a last (k−1) data block in the data sequence, the controller determines the power of the first power function of the hash key according to an order of the second data block or the third data block in the last (k−1) data block; and when the received second data block or the third data block is not the last (k−1) data block in the data stream, the controller determines the power of the first power function of the hash key according to the value of k.

In an embodiment of the disclosure, the first calculation unit includes a third adder, a third multiplier, a third register, a fourth register, and a third multiplexer. The third multiplier is coupled to the third adder. The third register is coupled to the third adder and the third multiplier. The fourth register is coupled to the third register. The third multiplexer is coupled to the third multiplier and the controller. The third adder performs calculation on the received second data block or the third data block and a value of the third register and outputs a calculation result to the third multiplier; the third multiplexer outputs the first power function of the hash key to the third multiplier under the control of the controller; the third multiplier performs calculation according to a calculation result of the third adder and the first power function of the hash key, and stores a calculation result to the third register to update the value of the third register; and when the ciphertext calculation circuit receives and completes calculation of all the second data blocks and the second quantity of the third data blocks, the controller controls to output the value of the third register as the second output.

In an embodiment of the disclosure, when the bubble processing circuit receives the first quantity of the third data blocks, the controller outputs the values in the third registers of the first quantity of the first calculation units in the k first calculation units correspondingly to the bubble processing circuit, at the same time, the remaining first calculation units are controlled to output the value in the third register to the fourth register to be stored, when the bubble processing circuit generates the third output, the value of the fourth register is used as the second output, and the second output and the third output are output synchronously.

In an embodiment of the disclosure, the bubble processing circuit generates the third output according to the first quantity of third data blocks received, outputs of the first quantity of the first calculation units, and at least a second power function of the hash key; a power of the second power function of the hash key is determined by the controller according to an order of the third data block in the data sequence.

In an embodiment of the disclosure, the bubble processing circuit includes a third calculation unit and a fourth calculation unit; the controller selectively enables the third calculation unit, or enables the third calculation unit and the fourth calculation unit according to a value of the first quantity.

In an embodiment of the disclosure, the third calculation unit includes a fourth adder, a fourth multiplier, a fifth register, a fourth multiplexer, and a fifth multiplexer. The fourth adder is coupled to the ciphertext calculation circuit. The fourth multiplier is coupled to the fourth adder. The fifth register is coupled to the fourth multiplier. The fourth multiplexer is coupled to the fourth adder. The fifth multiplexer is coupled to the fourth multiplier. The fifth multiplexer outputs the second power function of the hash key to the fourth multiplier under the control of the controller. The fourth multiplier performs calculation on a calculation result of the fourth adder and the second power function of the hash key, and stores a calculation result to the fifth register.

In an embodiment of the disclosure, the fourth calculation unit includes a fifth adder, a fifth multiplier, and a sixth register. The fifth multiplier is coupled to the fifth adder. The sixth register is coupled to the fifth multiplier. The fifth multiplier receives a calculation result of the fifth adder and the second power function of the hash key to perform calculation and stores a calculation result to the sixth register.

In an embodiment of the disclosure, the additional authentication data calculation circuit includes a second calculation unit and a shift unit. The second calculation unit is configured to receive the first data block, and perform calculation according to the first data block and the hash key to generate a first result. The shift unit is configured to determine a shift amount and transmit the shift amount to the second calculation unit, so that the second calculation unit shifts the first result to left according to the shift amount to generate the first output; when the Galois hash authentication-based circuit completes receiving all second data blocks and third data blocks, the controller controls the first multiplexer of the second calculation unit to output the shift amount to the first multiplier of the second calculation unit.

In an embodiment of the disclosure, the second calculation unit includes a second adder, a first multiplier, a first register, and a first multiplexer. The first multiplier is coupled to the second adder. The first register is coupled to the second adder, the first multiplier, and the first adder. The first multiplexer is coupled to the first multiplier, the shift unit, and the controller.

In an embodiment of the disclosure, the shift unit includes a second multiplier, a second register, and a second multiplexer. The second register is coupled to the second multiplier and the first multiplexer. The second multiplexer is coupled to the second multiplier and the controller. The controller controls a power of a third power function of the hash key output by the second multiplexer according to the total length of the second data block and the third data block. The second multiplier performs calculation according to the third power function of the hash key and a value of the second register, and stores a calculation result to the second register to update the value of the second register. When the Galois hash authentication-based circuit completes receiving all the second data blocks and third data blocks, the controller controls the first multiplexer to use the value of the second register as the shift amount to output to the second calculation unit.

In an embodiment of the disclosure, the Galois hash authentication-based circuit further includes a sixth multiplexer, an input terminal of the sixth multiplexer is coupled to the ciphertext calculation circuit, and an output terminal of the sixth multiplexer is coupled to the bubble processing circuit. The sixth multiplexer is configured to transmit outputs of the first quantity of the first calculation units to the bubble processing circuit under the control of the controller.

In an embodiment of the disclosure, the Galois hash authentication-based circuit further includes a seventh multiplexer, an input terminal of the seventh multiplexer is coupled to the ciphertext calculation circuit and the bubble processing circuit, and an output terminal of the seventh multiplexer is coupled to the first adder. The seventh multiplexer is configured to transmit the second output and the third output to the first adder under the control of the controller.

The circuit provided in the disclosure is disposed with the bubble processing circuit able to process the third data block (the third data block is, for example, a data block corresponding to the bubble data), which allows the ciphertext calculation circuit to continuously receive and process the subsequent data stream, and the problem of affecting the reception of the subsequent data stream due to processing of the third data block is avoided. In addition, the disclosure utilizes the additional authentication data calculation circuit and the ciphertext calculation circuit to receive and process the first data block and the second data block in the data stream respectively. On the one hand, this parallel calculation architecture improves data throughput and reduces latency, on the other hand, this calculation architecture has no requirements on the input order of the first data block and the second data block. The first data block and the second data block may be input in a sequential order or may be input in parallel, which enables the disclosure to simultaneously support different requirements of different GHASH standards on the data order. In addition, the quantity of the first calculation units in the ciphertext calculation circuit may be flexibly configured, which enables the solution of the disclosure to meet the requirements of data streams with different bit widths.

BRIEF DESCRIPTION OF THE DRAWINGS

FIG. 3B is a flow chart of generating output by the additional authentication data calculation circuit according to an embodiment of the disclosure.

DESCRIPTION OF THE EMBODIMENTS

Figures 1A, 1B:
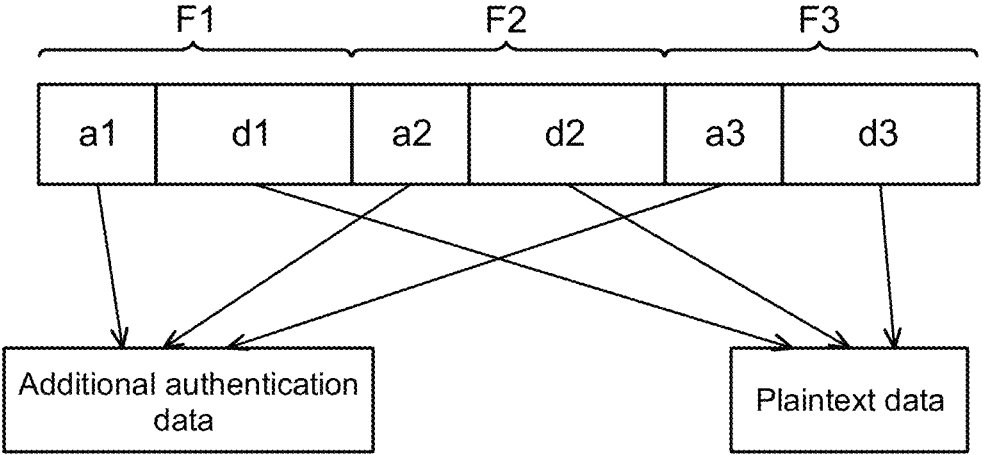
FIG. 1A is a schematic diagram of a data flow of the Ethernet protocol.
FIG. 1B is a schematic diagram of an exemplary flit format for an interconnect protocol.

Reference will now be made in detail to exemplary embodiments of the disclosure, examples of which are illustrated in the accompanying drawings. Whenever possible, the same reference numerals are used in the drawings and the description to refer to the same or similar parts.

In communication protocols such as PCIe-Gen6 and CXL using flits as the basic unit of transmission, a data stream usually includes multiple flits transmitted continuously, there is no interval between two adjacent flits, and each flit may include a flit header and ciphertext or plaintext. FIG. 1B shows an exemplary flit format, in which F1 includes a header a1 and plaintext d1, F2 may include a header a2 and plaintext d2, and F3 may include a header a3 and plaintext d3.

The data sequence that needs to be GHASH operated includes three parts, namely AAD, ciphertext or plaintext (for the convenience of description, "ciphertext or plaintext" will be collectively referred to as data payload below) and bubble data. Taking the CXL IDE transmission protocol as an example, the AAD comprises the header in each flit, and the data payload part includes the data payload in each flit. It may be seen that the AAD and the data payload in the CXL IDE transmission protocol are not input according to an order, but input in parallel. The bubble data is the data inserted after the AAD and the data payload, and may only include length data. The length data is used to indicate the length of the AAD and the length of the data payload. It should be understood that the length data may be calculated only after the GHASH operation circuit receives all flits included in the data stream. In an embodiment, the bubble data includes CRC data and the length data when the CRC data is enabled.

For example, if the data stream includes flit1 and flit2, in which flit1 includes a header A1 and data blocks X1 and X2 representing plaintext or ciphertext, and flit2 includes a header A2 and data blocks X3 and X4 representing plaintext or ciphertext, then the GHASH operation sequence may be expressed as:

$X=A1\|A2\|X1\|X2\|X3\|X4\|X(L)$, in which "$\|$" is a concatenation symbol, $X(L)$ is a data block formed by concatenating $len(A)$ and $len(C)$, that is, $len(A)\|len(C)$, in which $len(A)$ indicates the length of the AAD data block, that is, the total length of data blocks A1 and A2, and $len(C)$ is the length of the data payload, that is, the total length of data blocks X1, X2, X3, and X4. When CRC data is enabled, the data sequence for GHASH operation may be expressed as:

$X=A1\|A2\|X1\|X2\|X3\|X4\|X(CRC)\|X(L)$, in which $X(CRC)$ indicates the CRC data.

The GHASH operation circuit and the GHASH operation process of the disclosure will be described in detail below with reference to the accompanying drawings.

Figure 2:
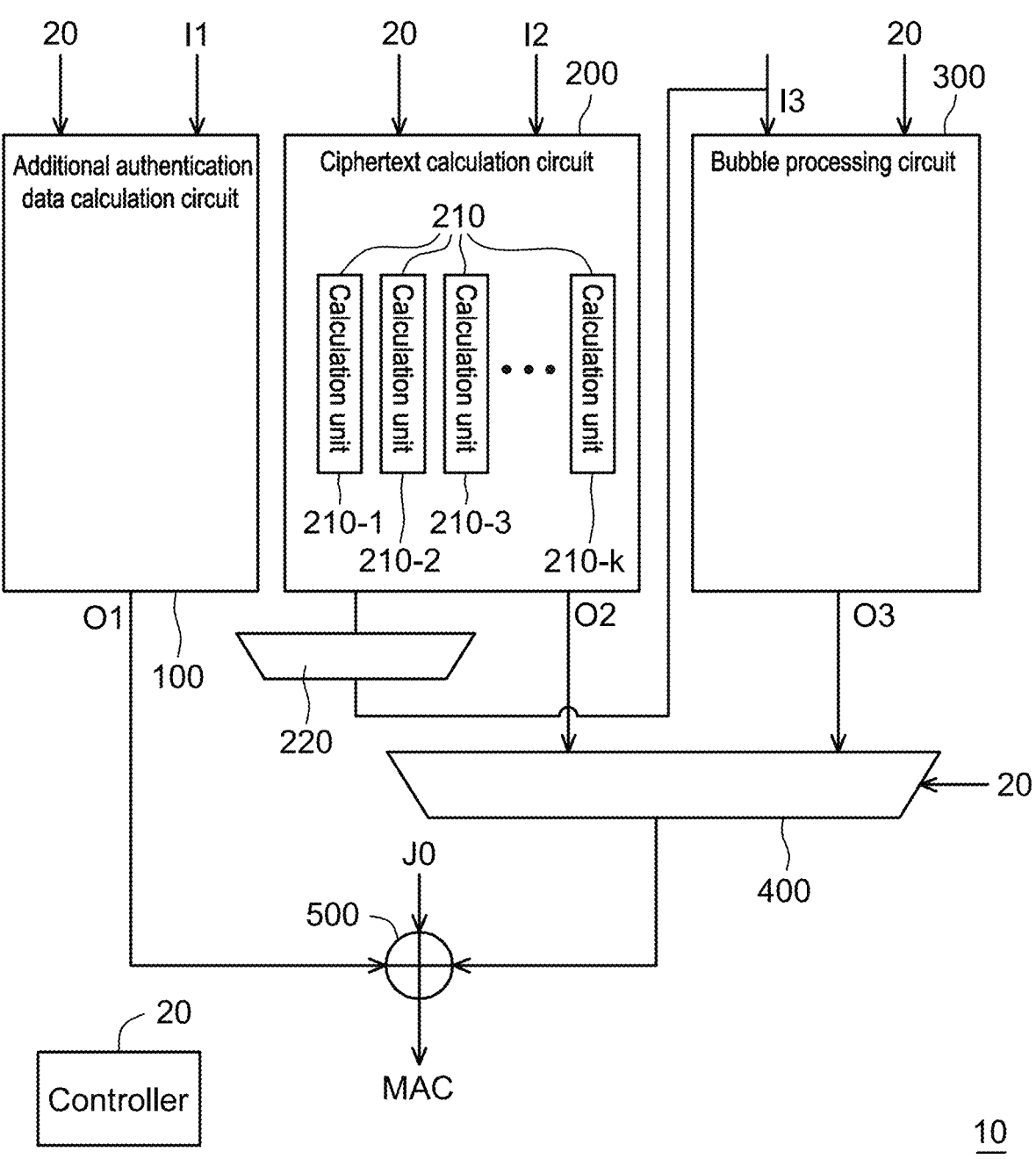
FIG. 2 is a schematic diagram of a GHASH authentication-based circuit according to an embodiment of the disclosure.

FIG. 2 is a schematic diagram of a GHASH authentication-based circuit 10 according to an embodiment of the disclosure.

The GHASH authentication-based circuit 10 may include a controller 20, an additional authentication data calculation circuit 100, a ciphertext calculation circuit 200, a bubble processing circuit 300, a multiplexer 220, a multiplexer 400, and an adder 500. It should be noted that the adder and the multiplier mentioned in the embodiments of the disclosure may be a Galois adder and a Galois multiplier, respectively.

The controller 20 may be coupled to the additional authentication data calculation circuit 100, the ciphertext calculation circuit 200, the bubble processing circuit 300, the multiplexer 220, and the multiplexer 400. The additional authentication data calculation circuit 100, the ciphertext calculation circuit 200, the bubble processing circuit 300, the multiplexer 220 or the multiplexer 400 may receive corresponding data and perform calculations under the control of the controller 20. The controller 20 is, for example, a central processing unit (CPU), or other programmable general-purpose or special-purpose micro control unit (MCU), a microprocessor, a digital signal processor (DSP), a programmable controller, an application specific integrated circuit (ASIC), a graphics processing unit (GPU), an image signal processor (ISP), an image processing unit (IPU), an arithmetic logic unit (ALU), a complex programmable logic device (CPLD), a field programmable gate array (FPGA), or other similar components or a combination of the above components.

An output terminal of the additional authentication data calculation circuit 100 may be coupled to the adder 500. The additional authentication data calculation circuit 100 may be used to receive one or more data blocks I1 corresponding to the AAD (the header in flit) in the data stream under the control of the controller 20, the calculation is performed according to the data block I1, and the calculation result is shifted according to the total length of the data payload and the bubble data to generate an output O1. Specifically, the additional authentication data calculation circuit 100 may include a shift unit 110 and a calculation unit 120. The calculation unit 120 is configured to perform a GHASH operation on the data block I1. The shift unit 110 is connected to the calculation unit 120 to shift the calculation result of the calculation unit 120 to the left under the control of the controller 20. The quantity of bits shifted to the left (that is, the shift amount) depends on the total bit width of the data payload and the bubble data (that is, the total data length).

An output terminal of the ciphertext calculation circuit 200 may be coupled to an input terminal of the multiplexer 220 and an input terminal of the multiplexer 400. The ciphertext calculation circuit 200 may be used to receive (for example, receive under the control of the controller 20) a plurality of data blocks I2, in which the plurality of data blocks I2 may include data blocks corresponding to the data payloads (the ciphertext or plaintext in a flit) and/or the bubble data. The ciphertext calculation circuit 200 generates an output O2 according to the plurality of data blocks I2. Specifically, the ciphertext calculation circuit 200 may include the plurality of calculation units 210 for receiving the data blocks I2 and performing the GHASH operation on the data blocks I2. An output terminal of each calculation unit 210 may be coupled to an input terminal of the multiplexer 220 and the input terminal of the multiplexer 400, respectively, and an output terminal of the multiplexer 220 may be coupled to the bubble processing circuit 300.

An output terminal of the bubble processing circuit 300 may be coupled to the input terminal of the multiplexer 400. The bubble processing circuit 300 may be configured to receive the calculation result of the ciphertext calculation circuit 200 outputted by the multiplexer 220 as a data block I3, and generate an output O3 according to the data block I3 and the bubble data. Specifically, the bubble processing circuit 300 may include a calculation unit 310 and a calculation unit 320 for receiving the bubble data and the data block I3 from the ciphertext calculation circuit 200 and generating the output O3 according to the data block I3 and the bubble data.

The input terminal of the multiplexer 400 may be coupled to the output terminal of the ciphertext calculation circuit 200 and the output terminal of the bubble processing circuit 300, respectively, and an output terminal of the multiplexer 400 is coupled to the adder 500. The multiplexer 400 may be coupled to the controller 20, and under the control of the controller 20, a corresponding output is selected from the output terminal of the ciphertext calculation circuit 200 and the output terminal of the bubble processing circuit 300 to transmit to the adder 500. The adder 500 performs a Galois addition operation to generate and output a message authentication code MAC according to the output of the additional authentication data calculation circuit 100, the output of the multiplexer 400, and the 0th packet sequence (that is, ciph-j0-value, also referred to as J0) of AES-GCM (Advanced Encryption Standard/Galois Counter Mode).

Figure 3A:
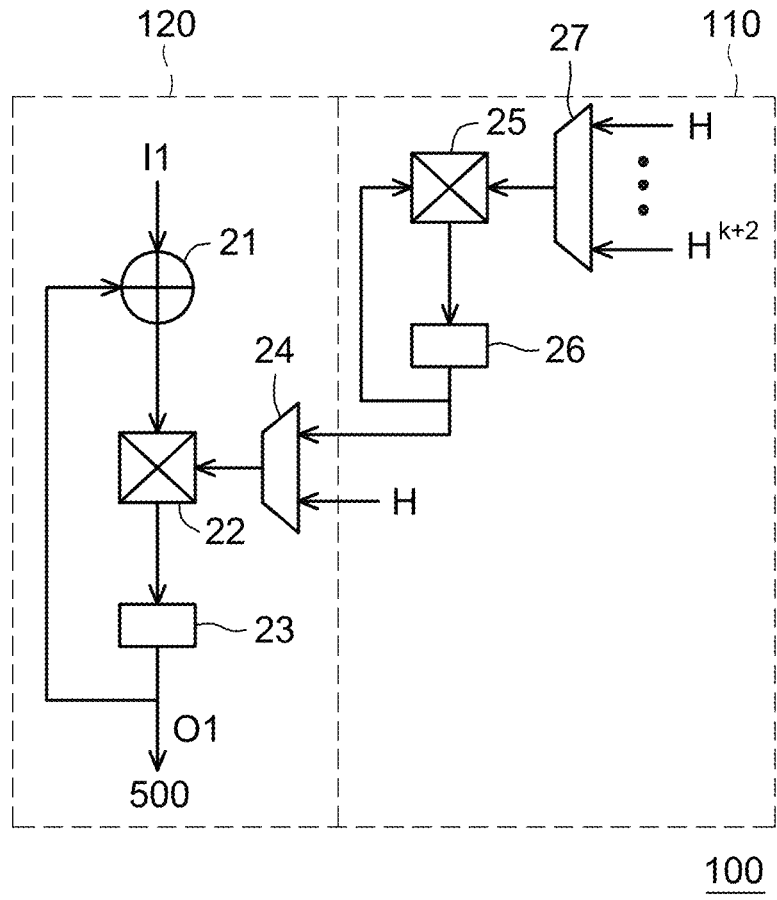
FIG. 3A is a circuit diagram of an additional authentication data calculation circuit according to an embodiment of the disclosure.

Referring to FIG. 3A and FIG. 3B, FIG. 3A is a circuit diagram of an additional authentication data calculation circuit 100 according to an embodiment of the disclosure, and FIG. 3B is a flow chart of generating the output O1 by the additional authentication data calculation circuit 100 according to an embodiment of the disclosure.

The calculation unit 120 of the additional authentication data calculation circuit 100 includes an adder 21, a multiplier 22, a register 23, and a multiplexer 24. As shown in FIG. 3A, an input terminal of the adder 21 may be used to receive (for example, received under the control of the controller 20) the data block I1, and the other input terminal may be coupled to the output terminal of the register 23. Input terminals of the multiplier 22 may be coupled to an output terminal of the adder 21 and an output terminal of the multiplexer 24, respectively. An output terminal of the multiplier 22 may be coupled to an input terminal of the register 23. The output terminal of the register 23 may be coupled to the adder 500 to transmit the output O1 to the adder 500. The initial value stored in the register 23 may be 0. An input terminal of the multiplexer 24 may be coupled to the output terminal of the shift unit 110, and another input terminal thereof receives a hash key H for the GHASH operation. The multiplexer 24 may be coupled to the controller 20 and controlled by the controller 20 to output the hash key H or the output of the shift unit 110 to the multiplier 22.

The shift unit 110 of the additional authentication data calculation circuit 100 includes a multiplier 25, a register 26, and a multiplexer 27. An input terminal of the multiplier 25 may be coupled to an output terminal of the multiplexer 27 and an output terminal of the register 26. An output terminal of the multiplier 25 may be coupled to an input terminal of the register 26. The initial value stored in the register 26 may be 1. The multiplexer 27 may be coupled to the controller 20. The multiple input terminals of the multiplexer 27 are respectively used to receive power functions of H of different powers. The power functions are H, H to the power of 2, H to the power of 3, . . . , H to the power of (k+2), in which k is the quantity of the calculation units 210 in the ciphertext calculation circuit 200. The multiplexer 27, under the control of the controller 20, selects the corresponding power function of H and outputs to the multiplier 25.

The process of performing the GHASH operation on the AAD by the additional authentication data calculation circuit 100 is described below together with FIG. 3A and FIG. 3B.

In step S201, the adder 21 may receive the data block I1 in the data stream and a value in the register 23 to perform calculation, in which the data block I1 may be a data block corresponding to the AAD.

In step S202, the multiplier 22 may receive the output value of the adder 21, and the multiplexer 24 may transmit the hash key H to the multiplier 22 under the control of the controller 20. The multiplier 22 may calculate the product of the output value of the adder 21 and H to update the value in the register 23.

It should be noted that each flit includes at most one data block corresponding to the AAD, so the additional authentication data calculation circuit 100 receives and calculates at most one data block corresponding to the AAD in each round.

For example, if the data block corresponding to the AAD in the currently received flit is data block A1, then the calculation process of the data block A1 is as follows.

The adder 21 receives the data block A1 and obtains the value of the register 23, and the initial value of the register 23 is 0. The adder 21 adds the data block A1 and the initial value 0 of the register 23 to obtain A1. The multiplier 22 multiplies the calculation result A1 of the adder 21 by H to obtain A1·H. At this time, the value of the register 23 is updated to A1·H.

If there are multiple data blocks corresponding to the AAD in the current data stream, then the above steps S201 to S202 may be repeated to respectively receive and calculate each data block corresponding to the AAD. Assuming that the currently received CXL data stream includes three data blocks corresponding to the AAD, then according to the receiving order, the three data blocks are A1, A2, and A3 sequentially, and the calculation unit 120 needs to perform three rounds of calculation.

The first round calculates the data block A1. As may be seen from the above, after the calculation of the data block A1 is completed, the value of the register 23 is updated to A1·H.

In the second round, the adder 21 receives the data block A2 and obtains the value A1·H of the register 23. The adder 21 adds the data block A2 and the value A1·H of the register 23 to obtain A1·H+A2. The multiplier 22 multiplies the calculation result of the adder 21 by H to obtain (A1·H+A2)·H. At this time, the value of the register 23 is updated to (A1·H+A2)·H.

In the third round, the adder 21 receives the data block A3 and obtains the value (A1·H+A2)·H of the register 23. The adder 21 adds the data block A3 and the value (A1·H+A2)·H of the register 23 to obtain (A1·H+A2)·H+A3. The multiplier 22 multiplies the calculation result of the adder 21 by H to obtain ((A1·H+A2)·H+A3)·H. At this time, the value of the register 23 is updated to ((A1·H+A2)·H+A3)·H.

In step S203, the controller 20 may control the multiplexer 27 to transmit $H^{Li}$ to the multiplier 25, and the multiplier 25 multiplies $H^{Li}$ by the value of the register 26 to update the value of the register 26, in which i is a calculation round, Li is the quantity of data blocks of data payload and bubble data received by the ciphertext calculation circuit 200 and the bubble processing circuit 300 in the i-th calculation round, and i is an integer greater than or equal to 1.

Specifically, the GHASH algorithm requires that the calculations be performed in the order of the operation sequence (for example, X=A1||A2||X1||X2||X3||X4||X(L)), that is, the AAD is calculated first, then the data payload is calculated, and finally the bubble data is calculated. In the CXL IDE transmission protocol, there is no chronological sequential order between the AAD and the data payload when being input. In an embodiment of the disclosure, the additional authentication data calculation circuit 100 is used to calculate the AAD separately, the calculation result of the AAD is shifted to the left as a whole, and the shift amount is the total length value of the data payload and the bubble data, so as to meet the requirements of the GHASH algorithm.

The data block corresponding to the data payload is received and processed by the ciphertext calculation circuit 200. The quantity of data blocks that the ciphertext calculation circuit 200 may receive in each round does not exceed the quantity k of the calculation units 210 in the ciphertext calculation circuit 200. When the quantity of data blocks corresponding to the data payload of the data stream exceeds k, the ciphertext calculation circuit 200 needs to receive and process in multiple rounds. Whether the bubble data is processed by the ciphertext calculation circuit 200, the bubble processing circuit 300, or both of the circuits depends on the relationship between the quantity of data blocks of the data payload received by the ciphertext calculation circuit 200 in the last round, the quantity of data blocks of the bubble data, and the quantity k of the calculation units 210. For example, if the quantity of data blocks of the data payload received by the ciphertext calculation circuit 200 in the last round is r (r is less than or equal to k), and the quantity of data blocks included in the bubble data is t (t is 1 or 2), when (r+t) is less than or equal to the quantity k of the calculation units 210, at this time, the ciphertext calculation circuit 200 may calculate the data payload and the bubble data together in the last round without enabling the bubble processing circuit 300; when (r+t) is greater than the quantity k of the calculation units 210, at this time, the ciphertext calculation circuit 200 may not complete the calculation of all bubble data in the last round, and a new round of calculation is needed to be added to calculate remaining bubble data. In this case, the remaining bubble data may be transmitted to the bubble processing circuit 300 for processing, so that the ciphertext calculation circuit 200 does not need to add a new calculation round and may directly process the next operation sequence. In other words, if the sum of the quantity of data blocks of the data payload and the quantity of data blocks included in the bubble data received by the GHASH authentication-based circuit 10 in the last round (for example, m, wherein m=r+t) is greater than the quantity k of the calculation units 210, then the controller 20 may input the last (m−k) data blocks in the bubble data into the bubble processing circuit 300 for processing, in which the (m−k) data blocks may include all bubble data or part of the bubble data.

For example, if the data block sequence of the data payload and the bubble data is: X1||X2||X3||X4||X5||X6||X7||X (L), and the quantity k of the calculation units 210 in the ciphertext calculation circuit 200 is 4. In the first round, the ciphertext calculation circuit 200 may receive four data blocks, namely X1, X2, X3, and X4. At this time, no data block is transmitted to the bubble processing circuit 300. Therefore, the quantity of data blocks L1=4, the controller 20 may control the multiplexer 27 to transmit $H^4$ to the multiplier 25, and the multiplier 25 multiplies $H^4$ by the initial value 1 of the register 26 to update the value in the register 26 to $H^4$. Next, in the second round, the ciphertext calculation circuit 200 may receive data blocks X5, X6, and X7. Since the sum of the quantity of the data blocks X5, X6, and X7 and X(L) is equal to the quantity k of the calculation units 210, the ciphertext calculation circuit 200 may calculate the data blocks X5, X6, and X7 and X(L) together in the second round. At this time, the bubble processing circuit 300 has not received any data. Therefore, in the second round, the quantity of data blocks L2=4, and the controller 20 may control the multiplexer 27 to transmit $H^4$ to the multiplier 25. The multiplier 25 may multiply $H^4$ by the value $H^4$ of the register 26 to update the value in the register 26 to $H^8$, in which the number 8 in $H^8$ is the sum of the quantity of data blocks included in the data payload and the bubble data.

In another example, it is assumed that the sequence of the data payload and the bubble data is: X1||X2||X3||X4||X5||X6||X7||X(CRC)||X(L), and the quantity of the calculation units 210 in the ciphertext calculation circuit 200 is 4. In the first round, the ciphertext calculation circuit 200 may receive four data blocks, namely X1, X2, X3, and X4. There is no data input in the bubble processing circuit 300. The quantity of data blocks L1=4, the controller 20 may control the multiplexer 27 to transmit $H^4$ to the multiplier 25, and the multiplier 25 may multiply $H^4$ by the initial value 1 of the register 26 to update the value in the register 26 to $H^4$. In the second round, the sum of the quantity of data blocks X5, X6, and X7 of the data payload and the quantity of data blocks X(CRC) and length data blocks X(L) of the CRC is greater than the quantity of the calculation units 210. Therefore, the controller 20 may control the ciphertext calculation circuit 200 to calculate the four data blocks (the data blocks X5, X6, and X7 and X(CRC)), and the remaining X(L) may be calculated by bubble processing circuit 300. At this time, the quantity of data blocks L2=5, and the controller 20 may control the multiplexer 27 to transmit $H^5$ to the multiplier 25. The multiplier 25 may multiply $H^5$ by the value $H^4$ of the register 26 to update the value in the register 26 to $H^9$, in which the number 9 in $H^9$ is the sum of the total quantity of data blocks included in the data payload and the bubble data.

After the GHASH authentication-based circuit 10 receives all data payloads and bubble data, the process may proceed to step S204.

In step S204, the controller 20 may control the multiplexer 24 to transmit the value in the register 26 to the multiplier 22. The multiplier 22 may multiply the output of the adder 21 and the value in the register 26 to update the value in the register 23.

For example, if the GHASH operation sequence X=A1||A2||A3||X1||X2||X3||X4||X5||X6||X7||X(L), it may be seen from the above steps S201 and S202 that after the data blocks A1, A2, and A3 are received and completed calculation, the value of the register 23 is $((A1 \cdot H+A2) \cdot H+A3) \cdot H$. From step S203, it may be seen that after receiving the data payload and the bubble data, the value of the register 26 is $H^8$. The value of the register 23 is multiplied by the value of the register 26 to obtain $((A1 \cdot H+A2) \cdot H+A3) \cdot H^9$, and update the value of the register 23 to $((A1 \cdot H+A2) \cdot H+A3) \cdot H^9$. It may be understood that multiplying the value of the register 23 by the value of the register 26 is equivalent to shifting the calculation result of AAD (the value of the register 23) to the left, and the shift length is the total length value of the data payload and the bubble data.

In step S205, the controller 20 may use the value of the register 23 as the output O1, and transmit the output O1 to the adder 500.

Continuing with the above example, the output O1 is $((A1 \cdot H + A2) \cdot H + A3) \cdot H^9$.

Figure 4A:
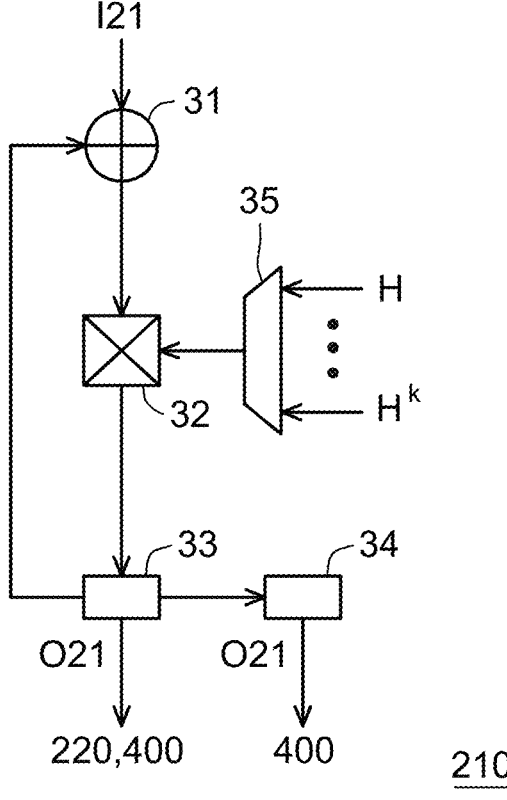
FIG. 4A is a circuit diagram of a calculation unit of a ciphertext calculation circuit according to an embodiment of the disclosure.
Figure 4B:
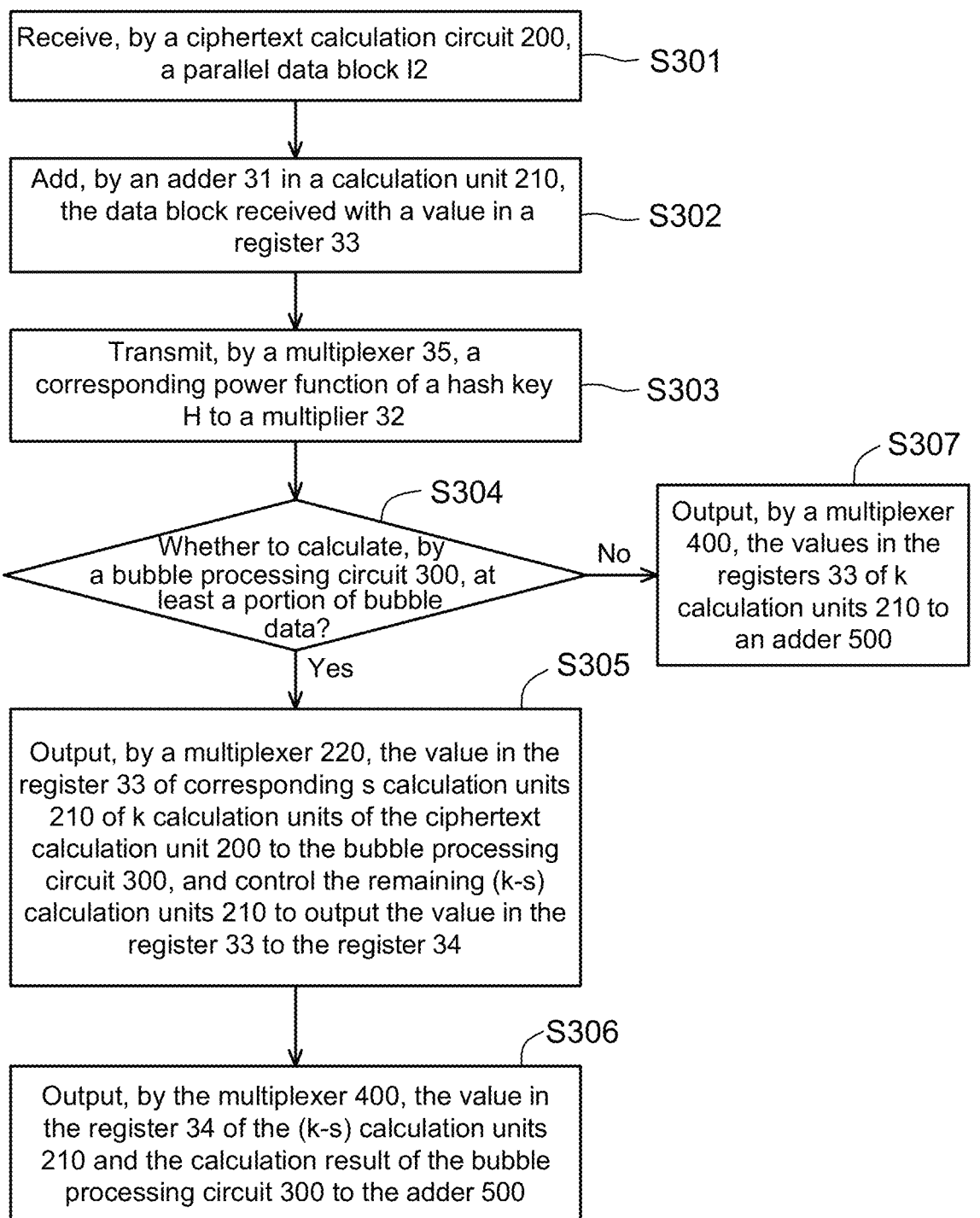
FIG. 4B is a flow chart of generating output by the ciphertext calculation circuit according to an embodiment of the disclosure.

Referring to FIG. 2, FIG. 4A, and FIG. 4B, FIG. 4A is a circuit diagram of the calculation unit 210 of the ciphertext calculation circuit 200 according to an embodiment of the disclosure, and FIG. 4B is a flow chart of generating the output O2 by the ciphertext calculation circuit 200 according to an embodiment of the disclosure. The ciphertext calculation circuit 200 may include k calculation units 210, in which k is a positive integer greater than 1. In some embodiments, k may preferably be 2, 4, 8, 16, . . . . The output terminal of each calculation unit 210 may be coupled to the input terminals of the multiplexer 220, 400. The calculation unit 210 may include an adder 31, a multiplier 32, a register 33, a register 34, and a multiplexer 35. An input terminal of the adder 31 may receive the data block I21 under the control of the controller 20, and the other input terminal may be coupled to the output terminal of the register 33. An input terminal of the multiplier 32 may be coupled to an output terminal of the adder 31 and an output terminal of the multiplexer 35. An output terminal of the multiplier 32 may be coupled to an input terminal of the register 33. The output terminal of the register 33 as a first output terminal of the calculation unit 210 may be coupled to the input terminal of the adder 31, the input terminal of the register 34, and the input terminals of the multiplexers 220, 400. The output terminal of the register 34 as a second output terminal of the calculation unit 210 may be coupled to the input terminal of the multiplexer 400. The initial value of the register 33 and the register 34 may be 0. The multiplexer 35 may be coupled to the controller 20 and controlled by the controller 20 to output power functions of H of different powers (that is, $H, H^2, . . . , H^k$, in which k is the quantity of the calculation units 210 in the ciphertext calculation circuit 200) to the multiplier 32.

Specifically, in step S301, the ciphertext calculation circuit 200 may receive the parallel data block I2, in which the parallel data block I2 may include one or more data blocks corresponding to the data payload, and may also include all or part of the data blocks corresponding to the bubble data. Also, the quantity of data blocks included in the parallel data block I2 is less than or equal to the quantity k of the plurality of calculation units 210. Each data block in the parallel data block I2 (for example, the data block I21 in FIG. 4A) may be received by each calculation unit 210.

For example, if the sequence of data payload and bubble data is: X1‖X2‖X3‖X4‖X5‖X6‖X7‖X(L), and the quantity k of the calculation units 210 is 4, then, each calculation unit 210 in the ciphertext calculation circuit 200 may receive data blocks X1, X2, X3, and X4 respectively in the first round. Each calculation unit 210 of the ciphertext calculation circuit 200 may receive data blocks X5, X6, X7, and X(L) respectively in the second round.

In step S302, the adder 31 in the calculation unit 210 adds the data block received with the value in the register 33, and outputs the calculation result to the multiplier 32.

Taking one of the calculation units 210 as an example, if in the first round, the data block received by the adder 31 is the data block X1, and the initial value of the register 33 is 0, then the calculation result of the adder 31 is X1. The calculation process of other calculation units is similar, so details will not be repeated here.

In step S303, under the control of the controller 20, the multiplexer 35 transmits the corresponding power function of the hash key H to the multiplier 32, in which the selectively enabling of the multiplexer 35 (that is, the selection of the power function of the hash key H) is determined according to the position of the data block received by the calculation unit 210 in the entire sequence (or the order in which GHASH authentication-based circuit 10 receives the data block) and the quantity k of the calculation units 210. The multiplier 32 may multiply the output of the adder 31 by the power function of H output by the multiplexer 35 to update the value in the register 33.

Specifically, if the controller 20 determines that the data block received by the adder 31 is one of the last (k−1) data blocks in the operation sequence, that is, the data block is one of the last (k−1) data blocks received by the GHASH authentication-based circuit 10, then the controller 20 determines the multiplexer 35 to output the power function of H according to the order of the data block in the last (k−1) data blocks. Let ki represent the order of the data block in the last (k−1) data blocks, and the power function of the output H of the multiplexer 35 is $H^{k-ki}$, in which ki=1, 2, . . . , (k−1). That is to say, if the data block is ordered first in the last (k−1) data blocks, that is, ki=1, then the power function of the output H of the multiplexer 35 is $H^{k-1}$. If the data block is ranked second in the last (k−1) data blocks, that is, ki=2, then the power function of the output H of the multiplexer 35 is $H^{k-2}$, by analogy, if the data block is ranked last in the last (k−1) data blocks, that is, ki=(k−1), then the power function of the output H of the multiplexer 35 is H.

If the controller 20 determines that the data block received by the adder 31 is not one of the last (k−1) data blocks in the operation sequence, then the power function of the output H of the multiplexer 35 is determined to be $H^k$.

For example, if the GHASH operation sequence X=A1‖A2‖A3‖X1‖X2‖X3‖X4‖X5‖X6‖X7‖X(L), the quantity k of the calculation units 210 is 4, then it may be seen that the last (k−1) data blocks are X6, X7, and X(L). For the three data blocks, the power functions of the output H of the multiplexer 35 are $H^3$, $H^2$, and H respectively, while for the data blocks X1, X2, X3, X4, and X5, the power function of the output H of the multiplexer 35 is always $H^4$.

It may be understood that the GHASH authentication-based circuit 10 first receives the data block in the data stream (such as the data block of AAD and the data block in the data payload), and then receives the data block X(L) of the bubble data. That is, the data block X(L) is the last data block received by the GHASH authentication-based circuit 10. Therefore, the power function of H corresponding to the data block X(L) is H. When the CRC data is enabled, the data block X(CRC) is the second to last data block received by the GHASH authentication-based circuit 10. Therefore, the power function of H corresponding to the data block X(L) is $H^2$, that is to say, for the data block of the bubble data, the power function of H corresponding to the data block is determined according to only the position of the data block in the entire sequence (or the order in which the GHASH authentication-based circuit 10 receives the data block).

In step S304, after all the data payloads are received, the controller 20 may determine whether the bubble processing circuit 300 is to calculate at least a portion of the bubble data.

As described above, the controller 20 may make a determination based on the relationship between the quantity of blocks of data payload and the quantity of bubble data blocks received by the ciphertext calculation circuit 200 at the last round and the quantity k of the calculation units 210. If the controller 20 determines that the bubble processing circuit 300 is needed to calculate at least a portion of the bubble data (for example, the sum of the quantity of data blocks of the data payload and the quantity of data blocks of the bubble data received in the last round is greater than k), then the process proceeds to step S305; if the controller 20 determines that the bubble processing circuit 300 is not needed to calculate the bubble data (for example, the sum of the quantity of data blocks of the data payload and the quantity of data blocks of the bubble data received in the last round are less than or equal to k), then the process proceeds to step S307.

In step S305, the controller 20 controls the multiplexer 220 to output the values (for example, the data block I3) in the register 33 of the corresponding s calculation units 210 among the k calculation units of the ciphertext calculation unit 200 to the bubble processing circuit 300, and the controller 20 controls the remaining (k-s) calculation units 210 to output the value in the register 33 to the register 34 to wait for the calculation result of the bubble processing circuit 300. After the bubble processing circuit 300 generates a calculation result, the value of the register 34 may be used as an output O21 to transmit to the multiplexer 400 together with the calculation result of the bubble processing circuit 300, and then transmit to the adder 500 by the multiplexer 400. The value of s is equal to the quantity of data blocks of the bubble data transmitted to the bubble processing circuit 300. Since the bubble data may include length data, or may include length data and CRC check data, the quantity of data blocks of the bubble data transmitted to the bubble processing circuit 300 is at most 2, that is, s may be equal to 1 or 2.

In step S306, after the bubble processing circuit 300 completes the calculation, under the control of the controller 20, the multiplexer 400 outputs the value in the register 34 of the (k−s) calculation units 210 (that is, the output O2 of the ciphertext calculation circuit 200, in which the output O2 includes the output O21 of the register 33 or the register 34) and the calculation result of the bubble processing circuit 300 (that is, the output O3 of the bubble processing circuit 300) to the adder 500.

In step S307, the controller 20 controls the multiplexer 400 to output the values in the registers 33 of the k calculation units 210 to the adder 500.

For example, if the GHASH operation sequence X=A1∥A2∥A3∥X1∥X2∥X3∥X4∥X5∥X6∥X7∥X(L), the quantity k of the calculation units 210 in the ciphertext calculation circuit 200 is 4, and the 4 calculation units are 210-1, 210-2, 210-3, and 210-4, respectively. Then, the calculation of the ciphertext calculation circuit 200 is as follows.

In the first round of calculation, the calculation units 210-1, 210-2, 210-3, and 210-4 receive the data blocks X1, X2, X3, and X4 respectively and perform parallel calculations. Taking the calculation unit 210-1 receiving the data block X1 as an example, the adder 31 adds X1 and the initial value 0 of the register 33 to obtain X1; the multiplier 32 multiplies the calculation result of the adder 31 by $H^4$ to obtain $X1·H^4$. At this time, the value in register 33 is updated to $X1·H^4$. Similarly, the values in the registers 33 in the other three calculation units 210-2, 210-3, and 210-4 are updated to $X2·H^4$, $X3·H^4$, and $X4·H^4$, respectively.

In the second round of calculation, the calculation units 210-1, 210-2, 210-3, and 210-4 receive the data blocks X5, X6, X7, and X(L) respectively and perform parallel calculations. Taking the calculation unit 210-1 receiving the data block X1 as an example, the adder 31 in the calculation unit 210-1 adds X5 to the value $X1·H^4$ in the register 33 to obtain $X5+X1·H^4$, the multiplier 32 multiplies the calculation result of the adder 31 by $H^4$ to obtain $(X1·H^4+X5)·H4$. At this time, the value in the register 33 is updated to $(X1·H^4+X5)·H4$. The values in the registers 33 in the other three calculation units 210-2, 210-3, and 210-4 are updated to $(X2·H^4+X6)$ $·H3$, $(X3·H^4+X7)·H2$, and $(X4·H^4+X(L))·H$, respectively.

At this time, the controller 20 may control the multiplexer 400 to output the values in the registers 33 of the four calculation units to the adder 500.

For example, if the input sequence X=A1∥A2∥A3∥X1∥X2∥X3∥X4∥X5∥X6∥X7∥X(CRC)∥X(L), in the first round, the calculation units 210-1, 210-2, 210-3, and 210-4 receive the data blocks X1, X2, X3, and X4, respectively. At the end of the first round, the values in the registers 33 in the calculation units 210-1, 210-2, 210-3, and 210-4 are updated to $X1·H^4$, $X2·H^4$, $X3·H^4$, and $X4·H^4$, respectively.

In the second round of calculation, the calculation units 210-1, 210-2, 210-3, and 210-4 receive the data blocks X5, X6, X7, and X (CRC) respectively. At the end of the second round, the values in the registers 33 in the calculation units 210-1, 210-2, 210-3, and 210-4 are updated to $(X1·H^4+X5)·H^4$, $(X2·H^4+X6)·H^4$, $(X3·H^4+X7)·H^3$, and $(X4·H^4+X(CRC))·H^2$, respectively.

After the second round, there is one last bubble data block X (L) left. In order to free up the ciphertext calculation circuit 200 for the next input sequence, the controller 20 may control the bubble processing circuit 300 to receive the data block X (L), at the same time, the multiplexer 220 is controlled to output the value in the register 33 of the calculation unit 210-1 (that is, $(X1·H^4+X5)·H^4$) to the bubble processing circuit 300. In addition, in order to synchronize the output of the ciphertext calculation circuit 200 with the output of the bubble processing circuit 300, the controller 20 may control other calculation units (the calculation units 210-2, 210-3, and 210-4) to output the values in the registers 33 thereof to the corresponding registers 34, respectively, to wait for the output of the bubble processing circuit 300.

Figure 5:
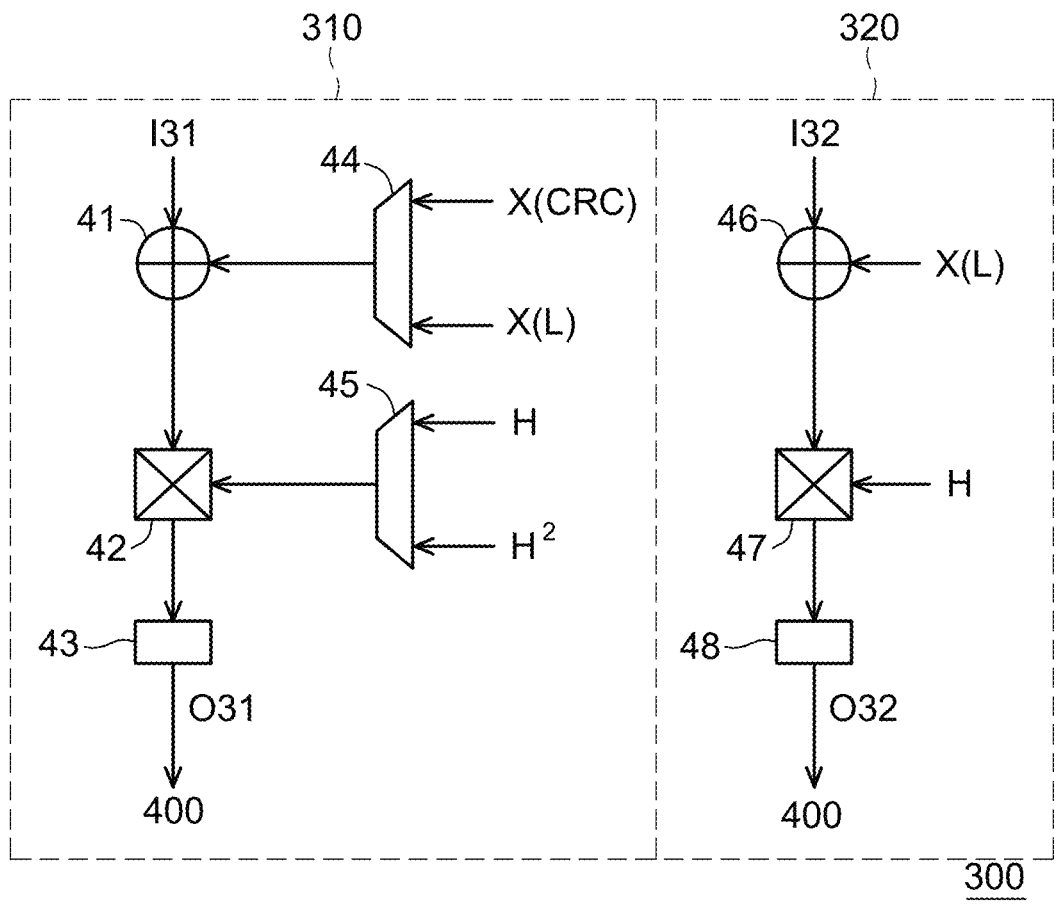
FIG. 5 is a circuit diagram of a bubble processing circuit according to an embodiment of the disclosure.

FIG. 5 is a circuit diagram of the bubble processing circuit 300 according to an embodiment of the disclosure. The bubble processing circuit 300 may include two calculation units 310 and 320, in which in the calculation unit 310, an input terminal of the adder 41 is used to receive the data block I31 (for example, an output value of the calculation unit 210) from the ciphertext calculation circuit 200, another input terminal is coupled to the multiplexer 44, and the multiplexer 44 may output the data block X (CRC) or X (L) to the adder 41 under the control of the controller 20; an input terminal of the multiplier 42 is coupled to the output terminal of the adder 41, and another input terminal is coupled to the multiplexer 45. The multiplexer 45 may output H or $H^2$ to the multiplier 42 under the control of the controller 20. An input terminal of the register 43 is coupled to an output terminal of the multiplier 42, and an output terminal is coupled to the multiplexer 400. In the calculation unit 320, an input terminal of the adder 46 is used to receive the data block I32 from the ciphertext calculation circuit 200 (for example, the output value of another calculation unit 210), if the multiplexer 44 outputs the data block X (CRC) to the adder 41, then another input terminal of the adder 46 is used to receive the data block X (L); an input terminal of the multiplier 47 is coupled to the output terminal of the adder 46, and another input terminal is used to receive H; an input terminal of the register 48 is coupled to an output terminal of multiplier 47, and an output terminal is coupled to the multiplexer 400.

The controller 20 may determine to enable the calculation unit 310, or both the calculation units 310 and 320, according to the quantity of data blocks of bubble data preserved to be processed by the bubble processing circuit 300. In addition, the controller 20 may determine the data block (X(CRC) or X(L)) output by the multiplexer 44 and the data (H or the power function $H^2$ of H) output by the multiplexer 45 according to the quantity of data blocks of bubble data preserved to be processed by the bubble processing circuit 300.

If the controller 20 determines that only one data block of bubble data (that is, the data block X(L)) is to be processed by the bubble processing circuit 300, then the calculation unit 310 may be selected to be enabled. Specifically, the controller 20 may control the multiplexer 44 to input the data block X(L) into the adder 41. The adder 41 may calculate the sum of the data block I31 and the data block X(L), and output the calculation result to the multiplier 42. The controller 20 may control the multiplexer 45 to transmit H (X(L) is the last data block in the input sequence) to the multiplier 42. The multiplier 42 may calculate the product of the output of the adder 41 (that is, the sum of the data block I31 and the data block X(L)) and H, and store the product in the register 43, in which the data block I31 is the value in the register 33 in the calculation unit 210-1 transmitted by the multiplexer 220. The controller 20 may use the output O31 of the register 43 as the output O3 of the bubble processing circuit 300, so as to transmit the output O3 to the multiplexer 400.

If the controller 20 determines that two bubble data blocks (that is, X(CRC) and X(L)) are input to the bubble processing circuit 300, then the calculation units 310 and 320 may be enabled at the same time, in which the calculation unit 310 is used to calculate X(CRC), and the calculation unit 320 is used to calculate X(L). Specifically, the controller 20 may control the multiplexer 44 to input the data block X (CRC) into the adder 41. The adder 41 may calculate the sum of the data block I31 and the data block X (CRC). The controller 20 may control the multiplexer 45 to transmit $H^2$ (X(CRC) is the second to last data block in the input sequence) to the multiplier 42. The multiplier 42 may calculate the product of the output of the adder 41 (that is, the sum of the data block I31 and the data block X (CRC)) and $H^2$, and store the product in the register 43, in which the data block I31 is the value in the register 33 in the calculation unit 210-1 transmitted by multiplexer 220. At the same time, the controller 20 may control the data block X(L) to be input into the adder 46. The adder 46 may calculate the sum of a data block I32 and the data block X(L), in which the data block I32 is the value in the register 33 in the calculation unit 210-2 transmitted by the multiplexer 220. The controller 20 may transmit H to the multiplier 47. The multiplier 47 may calculate the product of the output of the adder 46 (that is, the sum of the data block I32 and the data block X (L)) and H, and store the product in the register 48. The controller 20 may use the output O31 of the register 43 and the output O32 of the register 48 as the output O3 of the bubble processing circuit 300, so as to transmit the output O3 to the multiplexer 400, in which the output O3=O31+ O32.

The adder 500 performs a Galois addition operation according to the output O1 of the additional authentication data calculation circuit 100, the output O2 of the ciphertext calculation circuit, the output O3 of the bubble processing circuit 300, and the 0th block sequence (J0) of AES-GCM to generate and output a message authentication code MAC.

For example, it is assumed that the input sequence X=A1∥A2∥A3∥X1∥X2∥X3∥X4∥X5∥X6∥X7∥X(CRC)∥X(L), the quantity k of the calculation units 210 in the ciphertext calculation circuit 200 is 4, and the four calculation units are 210-1, 210-2, 210-3, and 210-4. As mentioned above, after the second round of calculation of the ciphertext calculation circuit 200 is completed, the values in the registers 33 of the calculation units 210-1, 210-2, 210-3, and 210-4 are respectively $(X1 \cdot H^4 + X5) \cdot H^4$, $(X2 \cdot H^4 + X6) \cdot H^4$, $(X3 \cdot H^4 + X7) \cdot H^3$, $(X4 \cdot H^4 + X \text{ (CRC)}) \cdot H^2$. The value in the register 33 of the calculation unit 210-1 (that is, $(X1 \cdot H^4 + X5) \cdot H^4$) is output to the calculation unit 310 in the bubble processing circuit 300, and the values in the registers 33 of other calculation units are output to the corresponding registers 34, respectively.

The adder 41 in the calculation unit 310 adds $(X1 \cdot H^4 + X5) \cdot H^4$ to X(L) output by the multiplexer 44 to obtain $(X1 \cdot H^4 + X5) \cdot H^4 + X$ (L), the multiplier 42 multiplies the calculation result of the adder 41 by H output by the multiplexer 45 to obtain $((X1 \cdot H^4 + X5) \cdot H^4 + X$ (L))·H, and stores it in the register 43.

The controller 20 may control the multiplexer 400 to output the value of the register 34 and the value in the register 43 to the adder 500.

In summary, the bubble processing circuit specifically used for processing the bubble data is provided in the circuit of the disclosure, so that the circuit of the disclosure may process the continuously input data stream without intervals. In addition, the disclosure processes AAD and data payload separately, the additional authentication data calculation circuit is used to receive and process AAD, and the ciphertext calculation circuit is used to receive and process data payload, so that in the disclosure, there is no requirements on the input order of AAD and data payload, and AAD and data payload may be input in the sequential order or may be input in parallel, that is, the disclosure may simultaneously support different requirements of different GHASH standards on the data order. Therefore, the disclosure may be applied not only to the CXL protocol format, but also to other data formats, such as the Ethernet shown in FIG. 1A.

For the data stream of Ethernet protocol, since the additional authentication data comes from the packet header and the data payload comes from the payload of the data packet, the additional authentication data and the data payload are input in chronological sequential order. Therefore, when using the circuit in FIG. 2 to perform the GHASH operation on the data stream of the Ethernet protocol, it is only necessary to use the ciphertext calculation circuit of the circuit in FIG. 2 to calculate the additional authentication data and the data payload sequentially according to the data input order, without enabling the additional authentication data calculation circuit.

Finally, it should be noted that the embodiments are only used to illustrate the technical solutions of the disclosure, and the embodiments are not to limit the disclosure. Although the disclosure has been described in detail with reference to the embodiments, persons skilled in the art should understand that the technical solutions described in the embodiments may still be modified, or some or all of the technical features thereof may be substituted by equivalents. However, these modifications or substitutions do not make the essence of the corresponding technical solutions deviate from the scope of the technical solutions of the embodiments of the disclosure.

What is claimed is:

1. A Galois hash authentication-based circuit, wherein the Galois hash authentication-based circuit is configured to perform calculation processing on a data sequence comprising a first data block, a second data block, and a third data block; and the Galois hash authentication-based circuit comprises:

an additional authentication data calculation circuit, receiving a first data block in a data stream and performing calculation according to the first data block, and shifting a calculation result to left according to a total length of a second data block and a third data block to generate a first output;

a ciphertext calculation circuit, wherein the ciphertext calculation circuit comprises k first calculation units, is configured to receive in parallel a second data block in the data stream in each round of calculation of the ciphertext calculation circuit, and perform parallel calculation on each of data blocks received to generate a second output, wherein k is a positive integer greater than 1;

a bubble processing circuit, receiving a first quantity of third data blocks after a last round of calculation of the ciphertext calculation circuit and performing calculation to generate a third output;

a controller, coupled to the additional authentication data calculation circuit, the ciphertext calculation circuit, and the bubble processing circuit; and a first adder, configured to perform calculation according to the first output, the second output, and the third output to generate a message authentication code.

2. The Galois hash authentication-based circuit according to claim 1, wherein the first calculation unit further receives in parallel a second quantity of third data blocks in the last round of calculation; values of the first quantity and the second quantity are determined by the controller based on a value of k, a quantity of the third data blocks, and a quantity of second data blocks received in the last round of calculation.

3. The Galois hash authentication-based circuit according to claim 2, wherein the first calculation unit performs calculation according to the received second data block or the third data block and a first power function of a hash key, wherein a power of the first power function of the hash key is determined by the controller according to an order of the received second data block or the third data block in the data sequence and the value of k.

4. The Galois hash authentication-based circuit according to claim 3, wherein in response to the received second data block or the third data block being a last (k−1) data block in the data sequence, the controller determines the power of the first power function of the hash key according to an order of the second data block or the third data block in the last (k−1) data block;

in response to the received second data block or the third data block not being the last (k−1) data block in the data sequence, the controller determines the power of the first power function of the hash key according to the value of k.

5. The Galois hash authentication-based circuit according to claim 3, wherein the first calculation unit comprises:

a third adder;

a third multiplier, coupled to the third adder;

a third register, coupled to the third adder and the third multiplier;

a fourth register, coupled to the third register; and a third multiplexer, coupled to the third multiplier and the controller, wherein the third adder performs calculation on the received second data block or the third data block and a value of the third register and outputs a calculation result to the third multiplier, the third multiplexer outputs the first power function of the hash key to the third multiplier under control of the controller, the third multiplier performs calculation according to a calculation result of the third adder and the first power function of the hash key, and stores a calculation result to the third register to update the value of the third register; in response to the ciphertext calculation circuit receiving and completing calculation of all the second data blocks and the second quantity of the third data blocks, the controller controls to output the value of the third register as the second output.

6. The Galois hash authentication-based circuit according to claim 5, wherein in response to the bubble processing circuit receiving the first quantity of the third data blocks, the controller outputs corresponding values in the third registers of first quantity of first calculation units in the k first calculation units to the bubble processing circuit, at the same time, the remaining first calculation units are controlled to output the value in the third register to the fourth register to be stored, in response to the bubble processing circuit generating the third output, a value of the fourth register is used as the second output, and the second output and the third output are output synchronously.

7. The Galois hash authentication-based circuit according to claim 1, wherein the bubble processing circuit generates the third output according to the first quantity of third data blocks received, outputs of the first quantity of the first calculation units, and at least a second power function of the hash key, wherein a power of the second power function of the hash key is determined by the controller according to an order of the third data block in the data sequence.

8. The Galois hash authentication-based circuit according to claim 7, wherein the bubble processing circuit comprises a third calculation unit and a fourth calculation unit;

the controller selectively enables the third calculation unit, or enables the third calculation unit and the fourth calculation unit according to a value of the first quantity.

9. The Galois hash authentication-based circuit according to claim 8, wherein the third calculation unit comprises:

a fourth adder, coupled to the ciphertext calculation circuit;

a fourth multiplier, coupled to the fourth adder;

a fifth register, coupled to the fourth multiplier;

a fourth multiplexer, coupled to the fourth adder; and a fifth multiplexer, coupled to the fourth multiplier, wherein the fifth multiplexer outputs the second power function of the hash key to the fourth multiplier under control of the controller, and the fourth multiplier performs calculation on a calculation result of the fourth adder and the second power function of the hash key, and stores a calculation result to the fifth register.

10. The Galois hash authentication-based circuit according to claim 9, wherein the fourth calculation unit comprises:

a fifth adder, coupled to the ciphertext calculation circuit;

a fifth multiplier, coupled to the fifth adder; and a sixth register, coupled to the fifth multiplier, wherein the fifth multiplier receives a calculation result of the fifth adder and the second power function of the hash key to perform calculation and stores a calculation result to the sixth register.

11. The Galois hash authentication-based circuit according to claim 1, wherein the additional authentication data calculation circuit comprises:

a second calculation unit, configured to receive the first data block, and perform calculation according to the first data block and the hash key to generate a first result;

a shift unit, configured to determine a shift amount, and transmit the shift amount to the second calculation unit, so that the second calculation unit shifts the first result to left according to the shift amount to generate the first output, wherein in response to the Galois hash authentication-based circuit completing receiving all second data blocks and third data blocks, the controller controls the shift unit to output the shift amount to the second calculation unit.

12. The Galois hash authentication-based circuit according to claim 11, wherein the second calculation unit comprises:

a second adder;

a first multiplier, coupled to the second adder;

a first register, coupled to the second adder, the first multiplier, and the first adder; and a first multiplexer, coupled to the first multiplier, the shift unit, and the controller.

13. The Galois hash authentication-based circuit according to claim 12, wherein the shift unit comprises:

a second multiplier;

a second register, coupled to the second multiplier and the first multiplexer; and a second multiplexer, coupled to the second multiplier and the controller, wherein the controller determines a power of a third power function of the hash key output by the second multiplexer according to the total length of the second data block and the third data block, the second multiplier performs calculation according to the third power function of the hash key and a value of the second register, and stores a calculation result to the second register to update the value of the second register; and in response to the Galois hash authentication-based circuit completing receiving all the second data blocks and the third data blocks, the controller controls the first multiplexer to use the value of the second register as the shift amount to output to the second calculation unit.

14. The Galois hash authentication-based circuit according to claim 7, further comprising a sixth multiplexer, an input terminal of the sixth multiplexer is coupled to the ciphertext calculation circuit, an output terminal of the sixth multiplexer is coupled to the bubble processing circuit, and the sixth multiplexer is configured to transmit outputs of the first quantity of the first calculation units to the bubble processing circuit under control of the controller.

15. The Galois hash authentication-based circuit according to claim 1, further comprising a seventh multiplexer, an input terminal of the seventh multiplexer is coupled to the ciphertext calculation circuit and the bubble processing circuit, and an output terminal of the seventh multiplexer is coupled to the first adder, and the seventh multiplexer is configured to transmit the second output and the third output to the first adder under control of the controller.

* * * * *